(12) United States Patent
Lyders et al.

(10) Patent No.: US 11,168,572 B2
(45) Date of Patent: Nov. 9, 2021

(54) COMPOSITE GAS TURBINE ENGINE COMPONENT

(71) Applicant: United Technologies Corporation, Farmington, CT (US)

(72) Inventors: David R. Lyders, Glastonbury, CT (US); Peter Karkos, Old Saybrook, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 274 days.

(21) Appl. No.: 16/267,494

(22) Filed: Feb. 5, 2019

(65) Prior Publication Data
US 2020/0248570 A1 Aug. 6, 2020

(51) Int. Cl.
*F01D 5/28* (2006.01)
*F01D 5/14* (2006.01)
*F01D 5/30* (2006.01)

(52) U.S. Cl.
CPC .......... *F01D 5/282* (2013.01); *F01D 5/147* (2013.01); *F01D 5/3053* (2013.01); *F05D 2250/11* (2013.01); *F05D 2250/283* (2013.01); *F05D 2260/30* (2013.01); *F05D 2300/603* (2013.01)

(58) Field of Classification Search
CPC ...... F01D 11/008; F01D 5/282; F01D 5/3053; F01D 5/147; F01D 5/3007; F05D 2250/283; F05D 2300/603
See application file for complete search history.

(56) References Cited

U.S. PATENT DOCUMENTS

| 3,566,493 A * | 3/1971 | Pounder ............. B29D 99/0025 29/889.71 |
| 5,281,096 A | 1/1994 | Harris et al. |
| 5,421,704 A | 6/1995 | Carletti et al. |
| 6,416,280 B1 * | 7/2002 | Forrester ............... F01D 11/008 416/94 |

(Continued)

FOREIGN PATENT DOCUMENTS

| EP | 1209322 | 5/2002 |
| EP | 3121386 | 1/2017 |

OTHER PUBLICATIONS

European Search Report for European Patent Application No. 20155712.1 completed May 26, 2020.

*Primary Examiner* — Igor Kershteyn
*Assistant Examiner* — Andrew Thanh Bui
(74) *Attorney, Agent, or Firm* — Carlson, Gaskey & Olds, P.C.

(57) ABSTRACT

A platform for a gas turbine engine according to an example of the present disclosure includes, among other things, a platform body that has a gas path surface extending axially between a leading edge and a trailing edge and extending circumferentially between opposed mate faces. A plurality of platform flanges extend from the platform body to define one or more slots. The one or more slots are dimensioned to receive a respective flange of a rotatable hub, and each platform flange has a retention member dimensioned to receive a retention pin to mount the platform body. The platform body includes a composite wrap extending about a perimeter of the platform body to define an internal cavity. At least one honeycomb core has a plurality of cells that is disposed in the internal cavity.

22 Claims, 6 Drawing Sheets

(56) References Cited

U.S. PATENT DOCUMENTS

| | | | |
|---|---|---|---|
| 6,447,250 B1 * | 9/2002 | Corrigan | F04D 29/321 |
| | | | 416/193 A |
| 10,119,423 B2 | 11/2018 | Kling et al. | |
| 2011/0243744 A1 * | 10/2011 | Forgue | F01D 5/3007 |
| | | | 416/204 A |
| 2015/0125305 A1 | 5/2015 | Duelm et al. | |

* cited by examiner

COMPOSITE GAS TURBINE ENGINE COMPONENT

BACKGROUND

This disclosure relates to a gas turbine engine, and more particularly to a rotor assembly including composite components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fan arrangements include fan spacers or platforms that define an aerodynamic surface between adjacent fan blades. The fan spacers may be fabricated from a composite material including ply layers.

SUMMARY

A platform for a gas turbine engine according to an example of the present disclosure includes a platform body that has a gas path surface extending axially between a leading edge and a trailing edge and extending circumferentially between opposed mate faces. A plurality of platform flanges extend from the platform body to define one or more slots. The one or more slots are dimensioned to receive a respective flange of a rotatable hub, and each platform flange has a retention member dimensioned to receive a retention pin to mount the platform body. The platform body includes a composite wrap extending about a perimeter of the platform body to define an internal cavity. At least one honeycomb core has a plurality of cells that is disposed in the internal cavity.

In a further embodiment of any of the foregoing embodiments, the composite wrap includes a plurality of composite layers that join together to define the internal cavity.

In a further embodiment of any of the foregoing embodiments, the composite wrap extends about a perimeter of the at least one honeycomb core.

In a further embodiment of any of the foregoing embodiments, the retention member is co-molded with the plurality of composite layers and the at least one honeycomb core.

In a further embodiment of any of the foregoing embodiments, the perimeter of the at least one honeycomb core has a substantially triangular geometry.

In a further embodiment of any of the foregoing embodiments, the retention member is a bushing between the composite wrap and the perimeter of the at least one honeycomb core.

In a further embodiment of any of the foregoing embodiments, the composite wrap includes one or more composite layer that loop about the at least one honeycomb core and the bushing to define a respective one of the platform flanges.

In a further embodiment of any of the foregoing embodiments, the at least one honeycomb core is dimensioned to span between at least two of the platform flanges.

In a further embodiment of any of the foregoing embodiments, the at least one honeycomb core is dimensioned to span across each of the platform flanges.

In a further embodiment of any of the foregoing embodiments, the at least one honeycomb core includes first, second and third platform cores, and the platform body includes a plurality of internal ribs that divide the internal cavity into first, second and third compartments that receive respective ones of the first, second and third platform cores.

In a further embodiment of any of the foregoing embodiments, each of the first and third platform cores is axially aligned with at least one of platform flanges, and the second platform core is spaced apart axially from the platform flanges. The first, second and third platform cores include first, second and third constructions, respectively, and the second construction differs in density from at least one of the first and third constructions.

A rotor assembly for a gas turbine engine according to an example of the present disclosure includes a rotatable hub extending along a longitudinal axis and carrying an array of airfoils. An array of platforms define a gas path surface between adjacent airfoils of the array of airfoils. Each of the platforms include first, second and third platform cores. A composite wrap defines a platform body and a plurality of platform flanges that mount the platform to the hub, and the composite wrap extends about a perimeter of the first, second and third platform cores. A plurality of internal ribs divide the internal cavity into first, second and third compartments that receive respective ones of the first, second and third platform cores such that the first and third platform cores are axially aligned with the plurality of flanges and such that the second platform core is spaced apart axially from the plurality of flanges with respect to the longitudinal axis.

In a further embodiment of any of the foregoing embodiments, the second platform core is between the first and second platform cores.

In a further embodiment of any of the foregoing embodiments, the first and third platform cores define the plurality of platform flanges.

In a further embodiment of any of the foregoing embodiments, the first, second and third platform cores include first, second and third constructions, respectively, and the second construction differs in stiffness from each of the first and third constructions.

In a further embodiment of any of the foregoing embodiments, at least one of the first, second and third platform cores is a honeycomb core including a plurality of cells.

In a further embodiment of any of the foregoing embodiments, each platform flange includes a retention member dimensioned to receive a retention pin to mount the platform body to the hub.

A gas turbine engine according to an example of the present disclosure include a fan section, a compressor section, a turbine section that drives the fan section and the compressor section, and a rotor assembly including a hub rotatable about an engine longitudinal axis. The hub has a plurality of flanges. An array of airfoils are circumferentially distributed about an outer periphery of the hub. Each one of the airfoils has an airfoil section extending from a root section mounted to the hub. An array of platforms are circumferentially distributed about the outer periphery of the hub to define an inner gas path boundary between adjacent airfoils of the array of airfoils, and each of the platforms include at least one honeycomb core that has a plurality of cells. A composite wrap extends about the at least one honeycomb core to define a plurality of platform flanges. A plurality of retention pins extend through the flanges of the hub and through the platform flanges of a respective one of the platforms to mechanically attach the respective one of the platforms to the hub.

In a further embodiment of any of the foregoing embodiments, the fan section comprises the rotor assembly.

In a further embodiment of any of the foregoing embodiments, the at least one honeycomb core includes first, second and third platform cores. Each platform includes a plurality of internal ribs between respective ones of the first, second and third platform cores such that the first and third platform cores are axially aligned with the platform flanges and such that the second core is spaced apart axially from the platform flanges with respect to the engine longitudinal axis.

The various features and advantages of this disclosure will become apparent to those skilled in the art from the following detailed description. The drawings that accompany the detailed description can be briefly described as follows.

DETAILED DESCRIPTION

Figure 1:
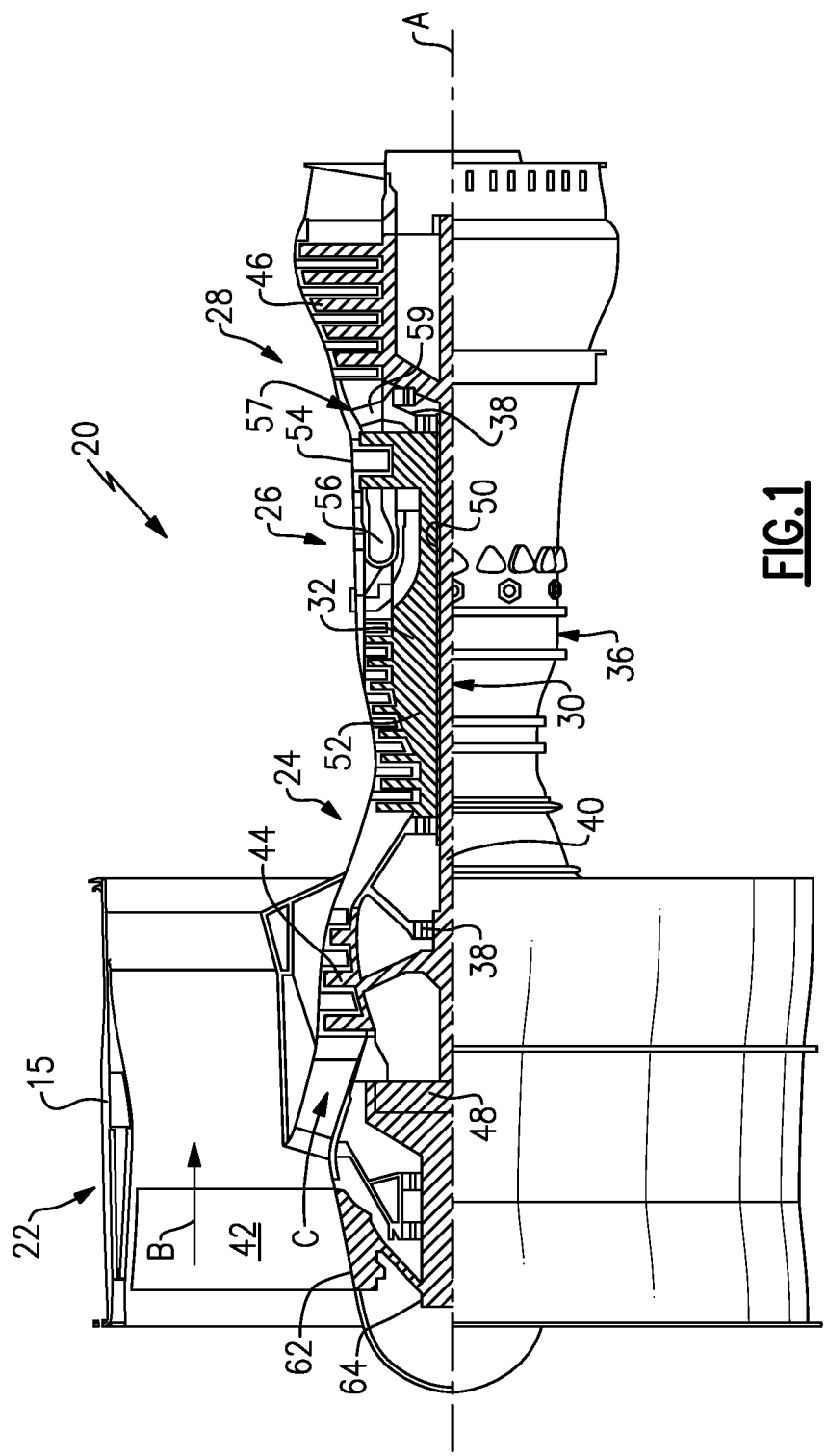
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
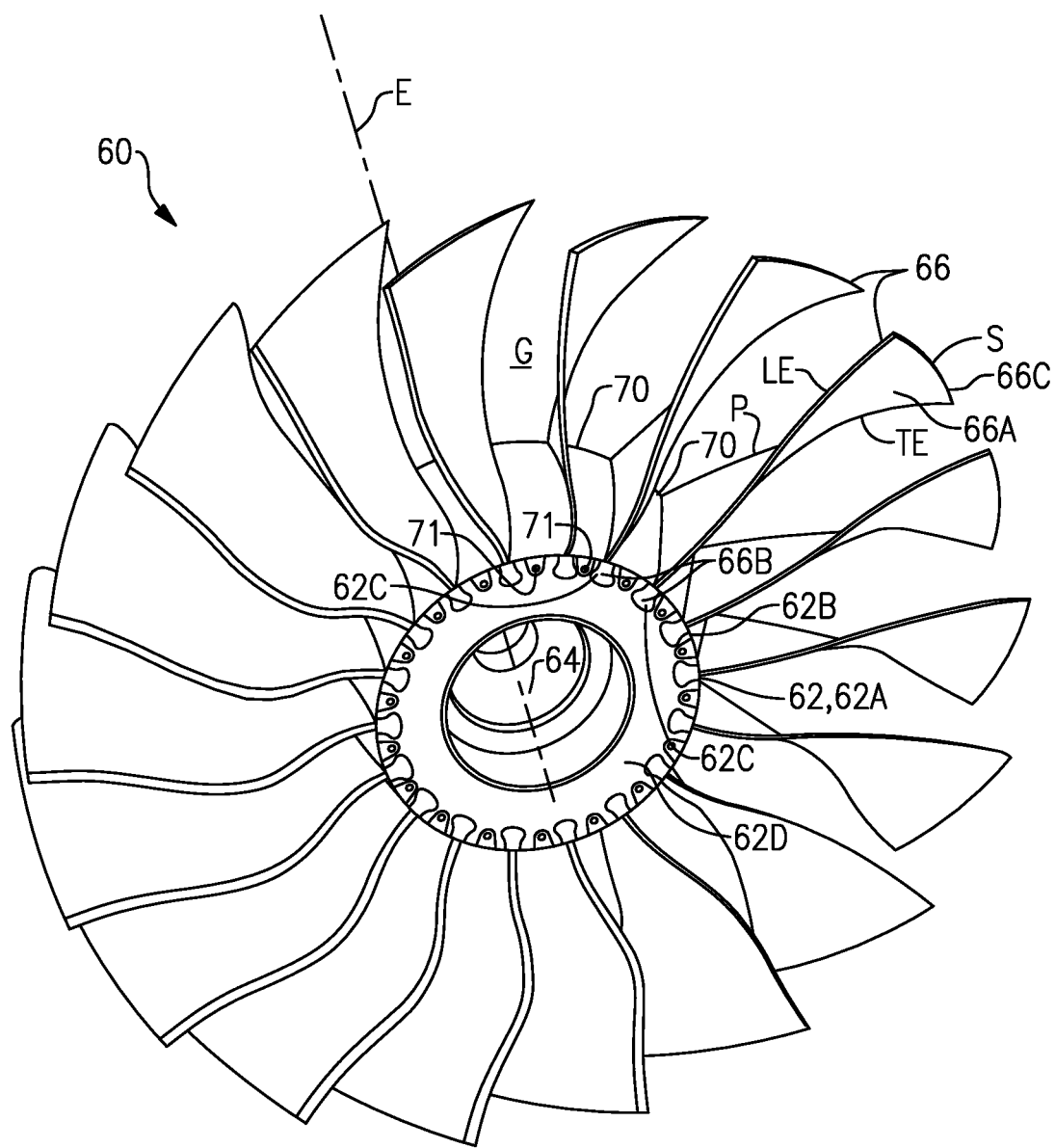
FIG. 2 illustrates a perspective view of an example rotor assembly including an array of airfoils and an array of platforms distributed about a longitudinal axis.

FIG. 2 illustrates a rotor assembly 60 for a gas turbine engine according to an example. The rotor assembly 60 can be incorporated into the fan section 22 or compressor section 24 of FIG. 1, for example. However, it should to be understood that other portions of the gas turbine engine 20, including blade and vane arrangements, and other systems may benefit from the teachings disclosed herein, such as a multi-stage fan or a land-based turbine.

The rotor assembly 60 includes a rotatable hub 62 mechanically attached or otherwise mounted to a fan shaft 64. The rotatable hub 62 includes a main body 62A that extends along a longitudinal axis E. The longitudinal axis E can be parallel to or collinear with the engine longitudinal axis A of FIG. 1. The fan shaft 64 and hub 62 are rotatable about the longitudinal axis E. The fan shaft 64 can be rotatably coupled to the low pressure turbine 46, as illustrated in FIG. 1.

The rotor assembly 60 includes an array of airfoils 66 circumferentially distributed about and carried by an outer periphery 62B of the rotatable hub 62. Each airfoil 66 includes an airfoil section 66A extending from a root section 66B. The hub 62 includes a plurality of retention slots 62C that extend inwardly from the outer periphery 62B of the hub 62. Each root section 66B is slideably received in a respective one of the retention slots 62C to mechanically attach or otherwise secure the airfoil 66 to the hub 62. The root section 66B can have a dovetail geometry (also shown in dashed lines in FIG. 3 for illustrative purposes) that mates with a contour of the respective retention slot 62C to mount the root section 66B to the hub 62.

The rotor assembly 60 includes an array of platforms 70. In the illustrative example of FIG. 2, the platforms 70 are separate and distinct from the airfoils 66. In other examples, the platforms 70 are integrally formed with one or more of the airfoils 66. The platforms 70 are circumferentially distributed about the outer periphery 62B of the hub 62. The platforms 70 are situated between and abut against adjacent pairs of airfoils 66 to define an inner boundary of a gas path G along the rotor assembly 60, as illustrated in FIG. 2. The platforms 70 are dimensioned to support the adjacent airfoils 66 and limit or otherwise oppose circumferential movement of the airfoils 66 during engine operation. The rotor assembly 60 includes a plurality of retention pins 71. Each platform 70 can be mechanically attached or otherwise releasably secured to the hub 62 with a respective one of the retention pins 71.

Figure 3:
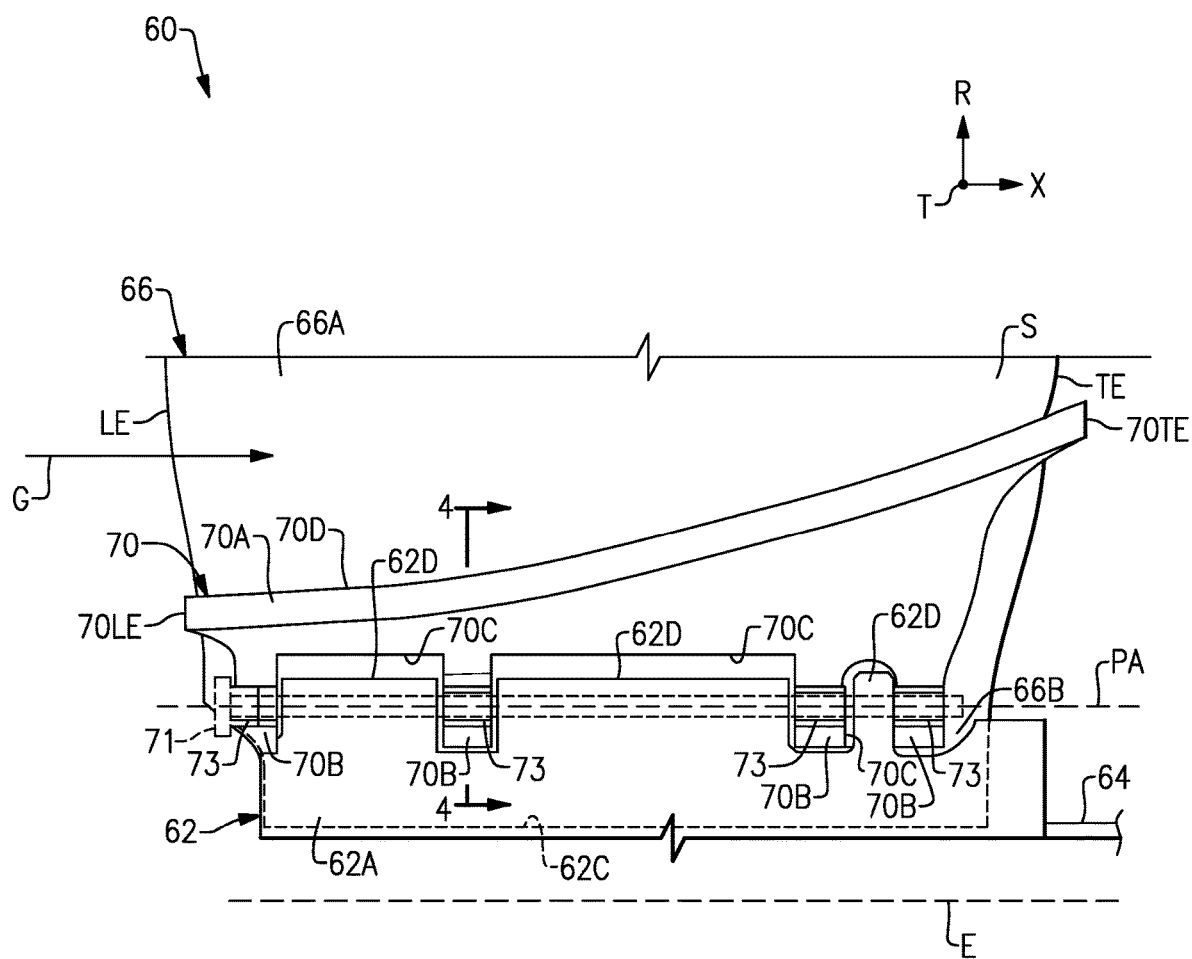
FIG. 3 illustrates a cross section of the rotor assembly along the longitudinal axis of FIG. 2 including one of the airfoils secured to a platform.

Referring to FIG. 3, with continuing reference to FIG. 2, one of the airfoils 66 and platforms 70 mounted to the hub 62 is shown for illustrative purposes. The airfoil section 66A extends between a leading edge LE and a trailing edge TE in a chordwise direction X, and extends in a radial direction R between the root section 66B and a tip portion 66C (FIG. 2) to provide an aerodynamic surface. The tip portion 66C defines a terminal end or radially outermost extent of the airfoil 66 to establish a clearance gap with fan case 15 (FIG. 1). The airfoil section 66A defines a pressure side P (FIG. 2) and a suction side S separated in a thickness direction T.

Each platform 70 includes a platform body 70A and a plurality of axially spaced apart platform flanges 70B that extend inwardly from the platform body 70A. The platform body 70A includes a platform base 70D dimensioned to abut against and extend along the airfoil section 66A and/or root section 66B of adjacent airfoils 66. The platform base 70D defines an aerodynamic contour and gas path surface of gas path G between the adjacent airfoils 66. The platform base 70D is dimensioned such that the gas path surface extends axially between leading and trailing edges 70LE, 70TE of the platform body 70A and extends circumferentially between opposed mate faces 70M of the platform body 70A. Each platform 70 defines an inner gas path boundary or surface between adjacent airfoils 66, as illustrated by FIG. 2.

The platform flanges 70B define one or more slots 70C between adjacent platform flanges 70B. The hub 62 includes a plurality of flanges 62D extending outwardly from the outer periphery 62B of the hub 62. Each flange 62D can have an annular geometry that extends circumferentially about the longitudinal axis E, as illustrated by FIG. 2. Each slot 70C is dimensioned to receive a respective flange 62D of the hub 62.

Each platform 70 is dimensioned to receive at least one retention pin 71 (shown in dashed lines in FIG. 3) to mechanically attach and mount the platform 70 to the hub 62. Each of the platform flanges 70B can include a respective retention member 73. The retention member 73 can be a bushing made of a metallic material, or a composite or non-metallic material. Each retention pin 71 extends along a pin axis PA in an installed position. Each retention member 73 can be axially aligned along the pin axis PA and dimensioned to slideably receive a common one of the retention pins 71 to mount the platform body 70A, as illustrated by FIG. 3. Each retention pin 71 is dimensioned to extend through each of the flanges 62D of the hub 62 and through each of the platform flanges 70B of the respective platform 70 to mechanically attach the platform 70 to the hub 62. In other examples, more than one retention pin 71 extends through the flanges 62D, 70B to mount the respective platform 70.

Figure 4:
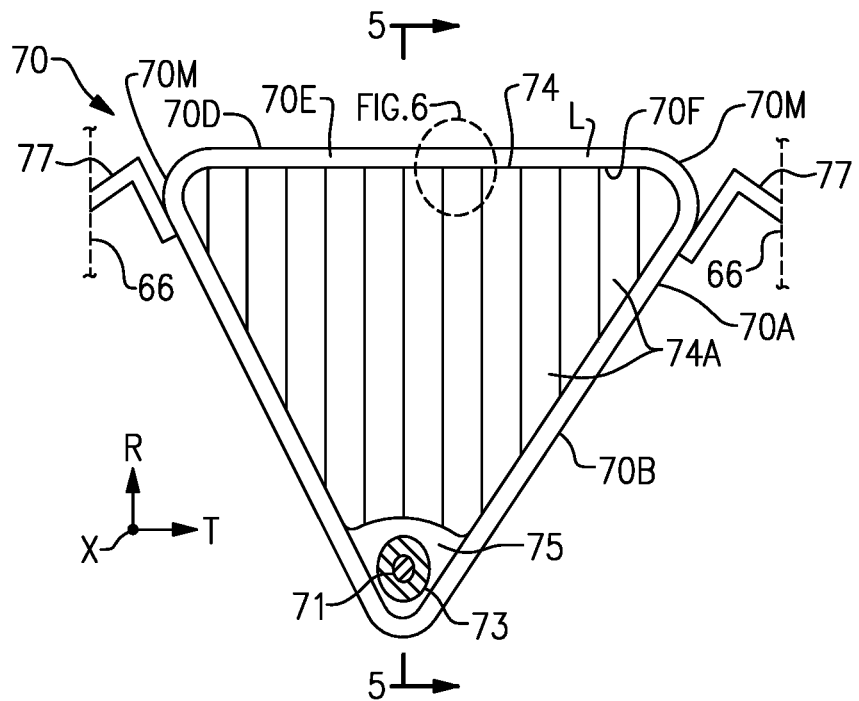
FIG. 4 illustrates a sectional view of the platform taken along line 4-4 of FIG. 3.
Figure 5:
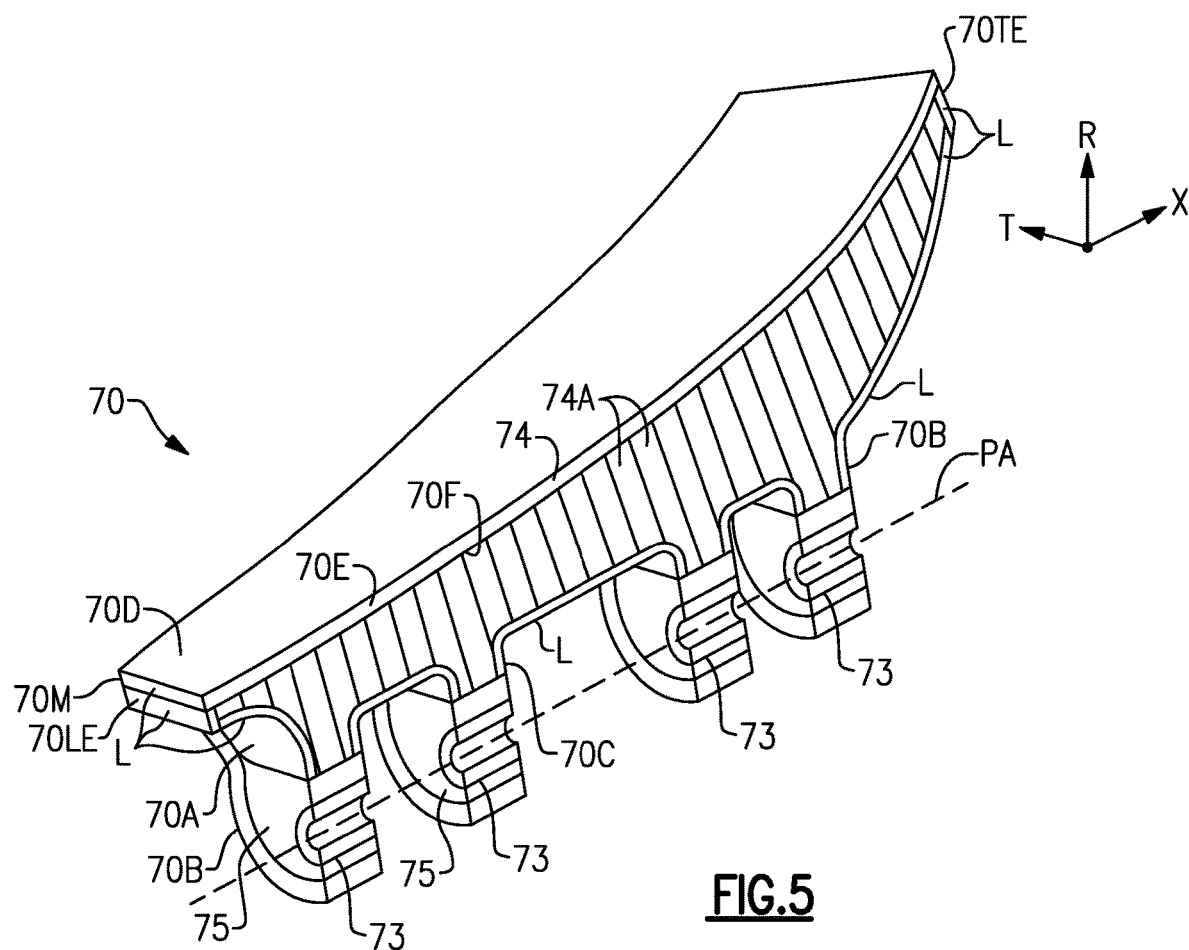
FIG. 5 illustrates a sectional view of the platform taken along line 5-5 of FIG. 4.

Referring to FIGS. 4 and 5, with continuing reference to FIGS. 2 and 3, each platform 70 is a composite component at least partially constructed from composite material(s). Example composite materials include thermoplastics and laminated fabrics such as organic matrix composites (OMC) having one or more ply layers or fibers in a resin matrix.

Figure 6:
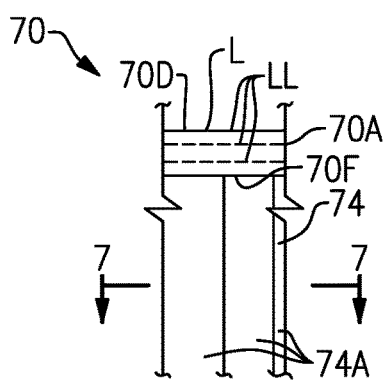
FIG. 6 illustrates selected portions of the platform of FIG. 5 including a platform core.

The platform 70 includes a composite wrap 70E defining the platform body 70A and platform flanges 70B. The composite wrap 70E extends about or otherwise defines a perimeter of the platform body 70A and platform flanges 70B to define at least one internal cavity 70F. The composite wrap 70E can be constructed from a layup of plies, for example. In the illustrated example of FIGS. 4 and 5, the composite wrap 70E includes a plurality of composite layers L. The composite layers L can form an organic matrix composite (OMC). The composite layers L join together to define the internal cavity 70F. One or more of the composite layers L can bound the internal cavity 70F between the leading and trailing edges 70LE, 70TE of the platform 70, as illustrated by FIG. 5. Each composite layer L can include one or more sublayers LL, as illustrated by FIG. 6.

Various materials can be utilized to construct the composite layers L. Example materials include one or more plies of uni-tape, braided yarns, fabric, and two-dimensional or three-dimensional woven fibers, for example. It should be appreciated that uni-tape plies include a plurality of fibers oriented in the same direction ("uni-directional), and fabric includes woven or interlaced fibers, each known in the art. Example fiber constructions include carbon fibers, fiberglass, Kevlar®, a ceramic such as Nextel™, a polyethylene such as Spectra®, and/or a combination of fibers. The fibers can be pre-impregnated with a resin.

The platform 70 includes at least one platform core 74 disposed in the internal cavity 70F. The platform core 74 can be dimensioned to span between at least two platform flanges 70B or span across each of the platform flanges 70B, as illustrated by FIG. 5.

Figure 7:
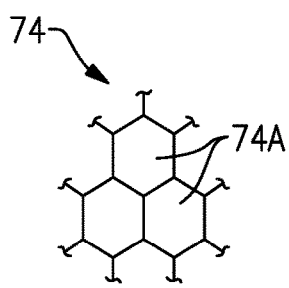
FIG. 7 illustrates the platform core taken along line 7-7 of FIG. 6.

The platform core 74 can be relatively stiff to reduce flow path and other load deflections. In the illustrated example of FIGS. 4-7, the platform core 74 is a honeycomb core including a plurality of cells 74A. The honeycomb core can be made of a metallic material or a non-metallic material, including a lightweight foam, balsawood, composite, paper or plastic, for example. The honeycomb core can be constructed according to a predefined stiffness to support adjacent airfoils 66 during engine operation. Each of the cells 74A can have a major component that extends in the radial direction R, as illustrated by FIGS. 4-6. In other examples, a major component of the cells 74A is arranged in the axial and/or thickness directions X, T. Each of the cells 74A can have a generally hexagonal geometry, as illustrated by FIG. 7. Each cell 74A can have other geometries, such as rectangular, elliptical or complex cross sectional geometries. The cells 74A can be extruded to define a predefined geometry. Each cell 74A can define a hollow interior to reduce weight. In other examples, an interior of one or more of the cells 74A is at least partially filled with material.

Figure 4A:
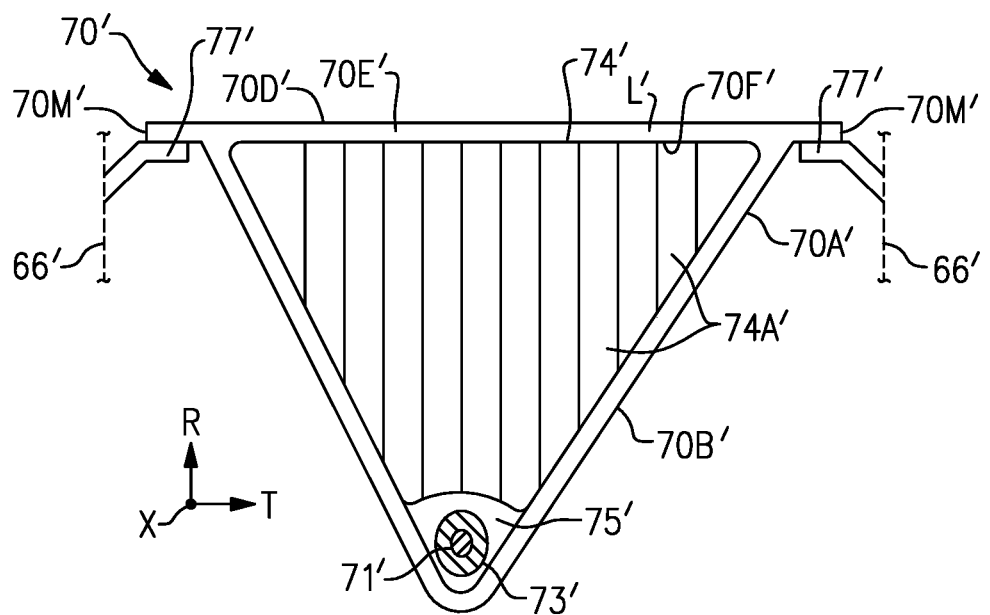
FIG. 4A illustrates a sectional view of a platform according to another example.

A perimeter of the platform core 74 can have a substantially triangular geometry, as illustrated by FIG. 4. The composite wrap 70E is dimensioned to follow or otherwise extend about the perimeter of the platform core 74 to enclose the internal cavity 70F. Seal members 77 can be fixedly secured to the mate faces 70M to seal against adjacent airfoils 66 (shown in dashed lines for illustrative purposes). The seal members 77 can be made of a rubber material, for example, and serve to absorb loads between the platform 70 and adjacent airfoils 66 during engine operation. In the illustrated example of FIG. 4A, platform base 70D' extends circumferentially outward of platform flanges 70B'.

Each retention member 73 can be supported in a filler or spacer 75 between the composite layers L and the perimeter of the platform core 74. The spacers 75 are dimensioned to complement a geometry of the internal cavity 70F and can serve to at least partially support the adjacent composite layers L during fabrication. The spacers 75 can also serve as structural members to support the composite layers L during engine operation. The retention members 73 and spacers 75 can reduce stress concentrations in the respective platform core 74, which can improve durability.

One or more of the composite layers L of the composite wrap 70E loop about the platform core 74 and retention member 73 to define a respective one of the platform flanges 70B, as illustrated by FIG. 4. The spacer 75 can be made of a composite material constructed from uni-tape plies, discontinuous chopped fibers in a resin matrix, preforms made of a bulk or sheet molding compound, and thermoplastics, for example. The retention members 73 can be co-molded and pre-cured with the composite layers L, platform core 74 and spacers 75. Material of the platform core 74 can be machined or otherwise dimensioned to a predefined geometry prior to molding. In some examples, the retention member 73 is defined by one or more composite layers L that are molded about a mandrel having a geometry that corresponds to the retention pins 71. The platform 70 can be cured utilizing various techniques, including compression molding or in a vacuum bag with autoclaving.

Figure 8:
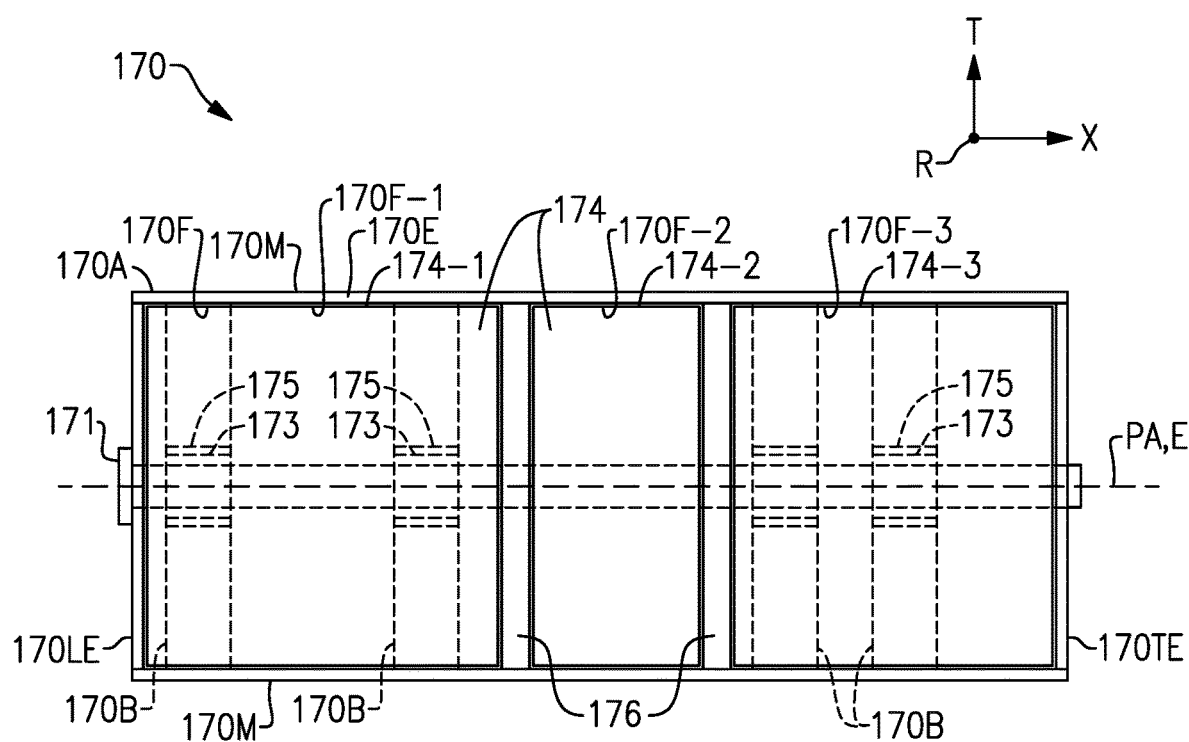
FIG. 8 illustrates a platform according to another example.

FIG. 8 illustrates a cross sectional view of a platform 170 according to another example. The platform 170 can be incorporated into the engine 20 of FIG. 1 or the rotor assembly 60 of FIG. 2, for example. In this disclosure, like reference numerals designate like elements where appropriate and reference numerals with the addition of one-hundred or multiples thereof designate modified elements that are understood to incorporate the same features and benefits of the corresponding original elements.

The platform 170 includes a plurality of platform cores 174 received in an internal cavity 170F defined by the composite wrap 170E. In the illustrated example of FIG. 8, the plurality of platform cores 174 includes first, second and third platform cores 174-1, 174-2, 174-3. It should be appreciated that fewer or more than three platform cores 174 can be utilized with the teachings disclosed herein.

The platform 170 includes a plurality of internal ribs 176 extending between opposed walls of composite wrap 170E. The internal ribs 176 can be arranged to support the composite wrap 170E and provide stiffness and rigidity to the platform 170. The internal ribs 176 divide the internal cavity 170F into first, second and third compartments 170E-1, 170E-2, 170E-3 that are dimensioned to receive respective ones of the first, second and third platform cores 174-1, 174-2, 174-3. The platform cores 174-1, 174-2 and/or 174-3 can be honeycomb cores, including any of the honeycomb cores disclosed herein. The second platform core 174-3 is situated between the first and third platform cores 174-1, 174-3, and the internal ribs 176 are between adjacent pairs of the platform cores 174. Each of the first and third platform cores 174-1, 174-2 can be axially aligned with at least one of platform flanges 170B relative to longitudinal axis E. The second platform core 174-2 can be spaced apart axially from the platform flanges 170B relative to longitudinal axis E. The first and third platform cores 174-1, 174-3 can define the flanges 170B (see also platform core 74 of FIGS. 3-5).

The platform cores 174-1, 174-2, 174-3 include first, second and third constructions, respectively. The constructions can be the same or can differ. In examples, the second construction of platform core 174-2 differs in density and/or stiffness from at least one, or each, of the first and third constructions of the platform cores 174-1, 174-3. The platform cores 174-1, 174-3 can have a relatively greater stiffness and/or density than the second platform core 174-2 and can be axially aligned with the respective platform flanges 170B to transfer one or more loads between the platform body 170A and hub during engine operation.

The platform cores 74/174 disclosed herein can reduce a number of composite plies or layers that establish a gas path between adjacent airfoils. Incorporation of the platform cores 74/174 can reduce a weight of the platform 70/70 and an overall weight of the rotor assembly.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A platform for a gas turbine engine comprising:
a platform body including a gas path surface extending axially between a leading edge and a trailing edge and extending circumferentially between opposed mate faces;
a plurality of platform flanges extending from the platform body to define one or more slots, the one or more slots dimensioned to receive a respective flange of a rotatable hub, and each platform flange includes a retention member dimensioned to receive a retention pin to mount the platform body;
wherein a composite wrap extends about a perimeter of the platform body to define an internal cavity and the plurality of platform flanges; and
at least one honeycomb core including a plurality of cells that is disposed in the internal cavity.

2. The platform as recited in claim 1, wherein the composite wrap includes a plurality of composite layers that join together to define the internal cavity.

3. The platform as recited in claim 2, wherein the composite wrap extends about a perimeter of the at least one honeycomb core.

4. The platform as recited in claim 3, wherein the retention member is co-molded with the plurality of composite layers and the at least one honeycomb core.

5. The platform as recited in claim 3, wherein the perimeter of the at least one honeycomb core is dimensioned such that circumferential walls of the at least one honeycomb core taper radially inwardly towards the plurality of platform flanges.

6. The platform as recited in claim 3, wherein the retention member is a bushing between the composite wrap and the perimeter of the at least one honeycomb core.

7. The platform as recited in claim 6, wherein the composite wrap includes one or more composite layers that loop about the at least one honeycomb core and the bushing to define a respective one of the platform flanges.

8. The platform as recited in claim 1, wherein the at least one honeycomb core is dimensioned to span between at least two of the platform flanges.

9. The platform as recited in claim 8, wherein the at least one honeycomb core is dimensioned to span across each of the platform flanges.

10. The platform as recited in claim 1, wherein the at least one honeycomb core includes first, second and third platform cores, and the platform body includes a plurality of internal ribs that divide the internal cavity into first, second and third compartments that receive respective ones of the first, second and third platform cores.

11. The platform as recited in claim 10, wherein:
each of the first and third platform cores is axially aligned with at least one of platform flanges, and the second platform core is spaced apart axially from the platform flanges; and
the first, second and third platform cores include first, second and third constructions, respectively, and the second construction differs in density from at least one of the first and third constructions.

12. A rotor assembly for a gas turbine engine comprising:
a rotatable hub extending along a longitudinal axis and carrying an array of airfoils; and
an array of platforms, each one of the platforms defining a gas path surface between adjacent airfoils of the array of airfoils, and wherein each of the platforms comprises:
first, second and third platform cores;
a composite wrap defining a platform body and a plurality of platform flanges that mount the platform to the hub, and the composite wrap extending about a perimeter of the first, second and third platform cores; and
a plurality of internal ribs that divide the internal cavity into first, second and third compartments that receive respective ones of the first, second and third platform cores such that the first and third platform cores are axially aligned with the plurality of flanges and such that the second platform core is spaced apart axially from the plurality of flanges with respect to the longitudinal axis.

13. The rotor assembly as recited in claim 12, wherein the second platform core is between the first and second platform cores.

14. The rotor assembly as recited in claim 12, wherein the first and third platform cores define the plurality of platform flanges.

15. The rotor assembly as recited in claim 12, wherein the first, second and third platform cores include first, second and third constructions, respectively, and the second construction differs in stiffness from each of the first and third constructions.

16. The rotor assembly as recited in claim 15, wherein at least one of the first, second and third platform cores is a honeycomb core including a plurality of cells.

17. The rotor assembly as recited in claim 12, wherein each platform flange includes a retention member dimensioned to receive a retention pin to mount the platform body to the hub.

18. A gas turbine engine comprising:
a fan section;
a compressor section;
a turbine section that drives the fan section and the compressor section; and
a rotor assembly comprising:
a hub rotatable about an engine longitudinal axis, the hub including a plurality of flanges;
an array of airfoils circumferentially distributed about an outer periphery of the hub, each one of the airfoils including an airfoil section extending from a root section mounted to the hub;
an array of platforms circumferentially distributed about the outer periphery of the hub to define an inner gas path boundary between adjacent airfoils of the array of airfoils, and each of the platforms comprising:
at least one honeycomb core including a plurality of cells; and
a composite wrap extending about the at least one honeycomb core to define a plurality of platform flanges; and
a plurality of retention pins, each one of the retention pins extending through the flanges of the hub and through the platform flanges of a respective one of the platforms to mechanically attach the respective one of the platforms to the hub.

19. The gas turbine engine as recited in claim 18, wherein the fan section comprises the rotor assembly.

20. The gas turbine engine as recited in claim 18, wherein:
the at least one honeycomb core includes first, second and third platform cores; and
each platform includes a plurality of internal ribs between respective ones of the first, second and third platform cores such that the first and third platform cores are axially aligned with the platform flanges and such that the second core is spaced apart axially from the platform flanges with respect to the engine longitudinal axis.

21. The rotor assembly as recited in claim 13, wherein:
each platform flange includes a retention member dimensioned to receive a retention pin to mount the platform body to the hub; and
the plurality of internal ribs extend circumferentially between opposed sidewalls bounding the internal cavity such that the second platform core is axially spaced apart from the first and second platform cores.

22. The gas turbine engine as recited in claim 20, wherein:
the retention members of the respective platform are axially aligned along a pin axis and are dimensioned to slideably receive a common one of the retention pins to mount the respective platform to the hub;
the retention member is a bushing between the composite wrap and the perimeter of the at least one honeycomb core; and
the composite wrap includes one or more composite layers that loop about the first, second and third platform cores and each of the bushings to define the platform flanges.

* * * * *